United States Patent [19]

Nithammer et al.

[11] Patent Number: 5,894,634
[45] Date of Patent: Apr. 13, 1999

[54] LATCH MECHANISM FOR VEHICLE SEAT

[75] Inventors: Egon Nithammer, Plainwell; Mark L. Gleason, Kalamazoo; Dana D. Kregling, Battle Creek, all of Mich.

[73] Assignee: Excel Industries, Inc., Elhkart, Ind.

[21] Appl. No.: 08/883,208

[22] Filed: Jun. 26, 1997

[51] Int. Cl.⁶ ..................................................... E05D 11/10
[52] U.S. Cl. ........................................ 16/325; 297/216.13
[58] Field of Search ............................. 16/325, 324, 331, 16/332, 334, 333; 297/216.13, 374

[56] References Cited

U.S. PATENT DOCUMENTS

| | | |
|---|---|---|
| 4,165,128 | 8/1979 | Strowick et al. ............... 297/216.13 X |
| 4,223,947 | 9/1980 | Cremer . |
| 4,611,853 | 9/1986 | Lehmann et al. . |
| 5,154,476 | 10/1992 | Haider et al. . |
| 5,414,897 | 5/1995 | Loewe . |
| 5,540,117 | 7/1996 | Hänsel et al. . |

Primary Examiner—Anthony Knight
Assistant Examiner—David Bochna
Attorney, Agent, or Firm—Banner & Witcoff, Ltd.

[57] ABSTRACT

A latch mechanism, particularly for securing a pivoting member of a motor vehicle seat with respect to a fixed member is disclosed, comprising, a latch plate having a tooth, a notch flanked by a front ramp and a rear ramp, and a rear stop, and a cam which is releasably engageable with the latch plate, the cam having a nose, a front face, a contact face and a heel. The cam is pivotable from a non-latching position to a normal latching position. In the latching position the contact face of the cam is urged against the rear ramp of the latch plate and the heel avoids contacting the rear stop. In response to a sudden change in velocity in a first direction the heel of the cam contacts the rear stop to resist movement of the cam the non-latching position. Preferably the contact face forms and angle with the back ramp of about 10 to 20 degrees, and the front face and the front ramp have generally equivalent curved surfaces.

12 Claims, 3 Drawing Sheets

LATCH MECHANISM FOR VEHICLE SEAT

FIELD OF THE INVENTION

The present invention generally relates to latching mechanisms for securing pivoting members relative fixed members, and more particularly to latching devices for securing the position of a seat of a motor vehicle.

BACKGROUND OF THE INVENTION

Latch mechanisms have been used to releasably secure a seat back against a seat base. For example, commonly owned U.S. Pat. No. 5,414,897 to Loewe teaches the use of a latch plate having a pocket, and a tooth with a latching face, where the tooth has a first radius of curvature about a center lying on a first axis. A latch is releasably engageable with the latch plate, and has a nose with a latching face. The nose has a second radius of curvature about a second center lying on a second axis, and the latching face of the nose mates with the latching face of the tooth in a latching position. The latch further comprises a heel which contacts the pocket upon movement of the latch into the latching position. In this way, the latch fits snugly into the latch plate. As the system wears the latch fits ever further against the latching face, maintaining tight contact and preventing chucking, that is, a loose fit between members that allows relative wobbling in response to vibrational forces. Although this design works well in securing a pivotable member relative a fixed member, it is sensitive to tolerance variations, potentially requiring secondary finishing operations.

In view of the foregoing, it is an object of the present invention to provide a latch mechanism which can allow for tolerance variations and secure a seat with minimal chucking and friction problems.

It is another object of the present invention to provide a latch mechanism for a motor vehicle seat having a self-locking feature in response to sudden changes in velocity.

It is yet another related object of the present invention to provide such a latch mechanism that is highly reliable in operation.

SUMMARY OF THE INVENTION

In accordance with these and other objects, there is provided a latch mechanism that is substantially insensitive to tolerance variations comprising a latch plate having a notch flanked by a front ramp and a rear ramp, the rear ramp sloping upward away from the notch, and a rear stop. A cam is releasably engageable with the latch plate, pivotable from a first latching position to a non-latching position, comprising a nose, a front face, a contact face and a heel, and biasing means for biasing the cam towards the latch plate wherein the contact face is biased against the rear ramp and the heel has a clearance from the rear stop in the first latching position, and in response to a sudden change of velocity in a first direction the heel of the cam contacts the stop to resist movement of the cam to the non-latching position.

Preferably the front face and the front ramp have curved surfaces which are generally equivalent to one another. By that it is meant preferably that the two surfaces have corresponding curvatures, for example, most preferably substantially equal curvatures so that the relative angles between surfaces is 0 degrees. Normal loads are transferred principally through interaction of the contact face with the rear ramp. However, a sudden change of velocity in a direction opposite the first urges the front face of the cam against the front ramp of the latch plate, resisting further motion of the cam. In this way the cam self-locks in response to inertial loading in both forward and rearward directions. Preferably the contact face and the rear ramp contact along a contact line, forming a contact angle. Advantageously, as the cam and latch plate wear the contact line between the contact face and the rear ramp moves down the rear ramp closer to the notch. Thus, precise tolerances are not required in these components in order to minimize chucking even after wear due to prolonged usage.

From the foregoing disclosure and the following more detailed description of various preferred embodiments it will be apparent to those skilled in the art that the present invention provides a significant advance in the technology and art of latch mechanisms. Particularly significant in this regard is the potential the invention affords for reducing sensitivity in latch mechanisms to tolerance variations and reducing the problems associated with such tolerance variations, such as "stickiness" or high efforts, and chucking. Additional features and advantages of various preferred embodiments will be better understood in view of the detailed description provided below.

Figure 1:
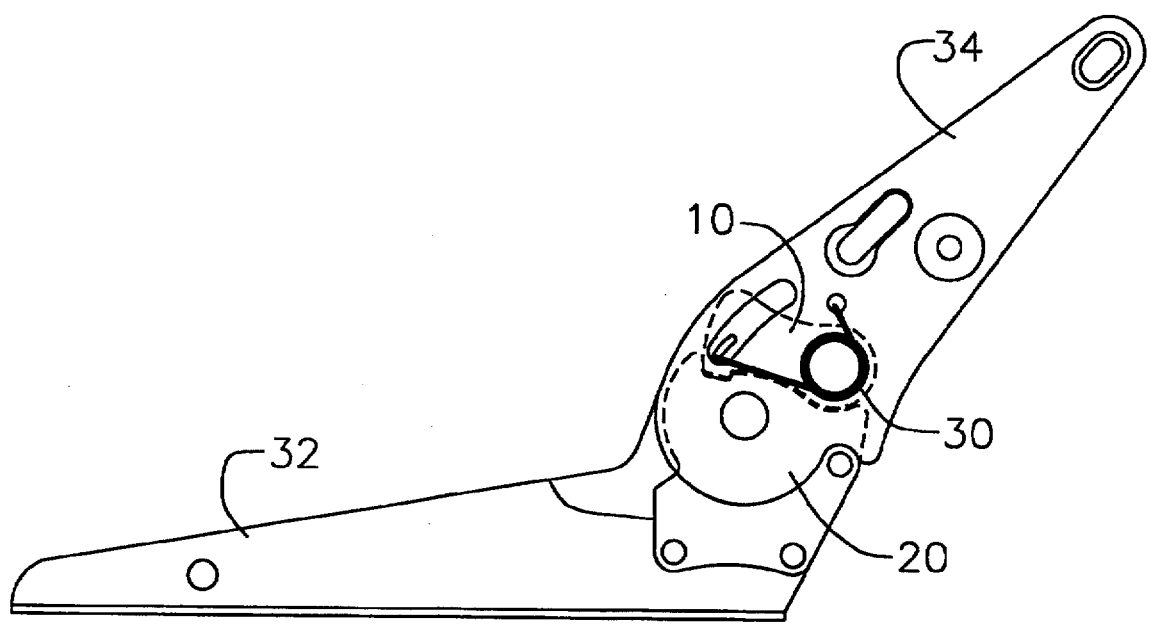
FIG. 1 is a schematic side elevation view of a latch mechanism for a motor vehicle seat in accordance with a preferred embodiment.

It should be understood that the appended drawings are not necessarily to scale, presenting a somewhat simplified representation of various preferred features illustrative of the basic principles of the invention. The specific design features of a latch mechanism as disclosed here, including, for example, specific dimensions of the surfaces of the cam and latch plate, or the clearance between the heel and the shoe, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the latch mechanism illustrated in the drawings. In general, front or frontward refers to a left direction in the plane of the paper in FIG. 1, and rear, rearward or backwards refers to a right direction in the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the latch mechanism disclosed here. The following detailed discussion of various alternative and preferred features and embodiments will illustrate the general principles of the invention with reference to a latch mechanism for use in a reclining motor vehicle seat. Other embodiments suitable for other applications, such as latches for armrests, will be apparent given the benefit of this disclosure.

Figure 2:
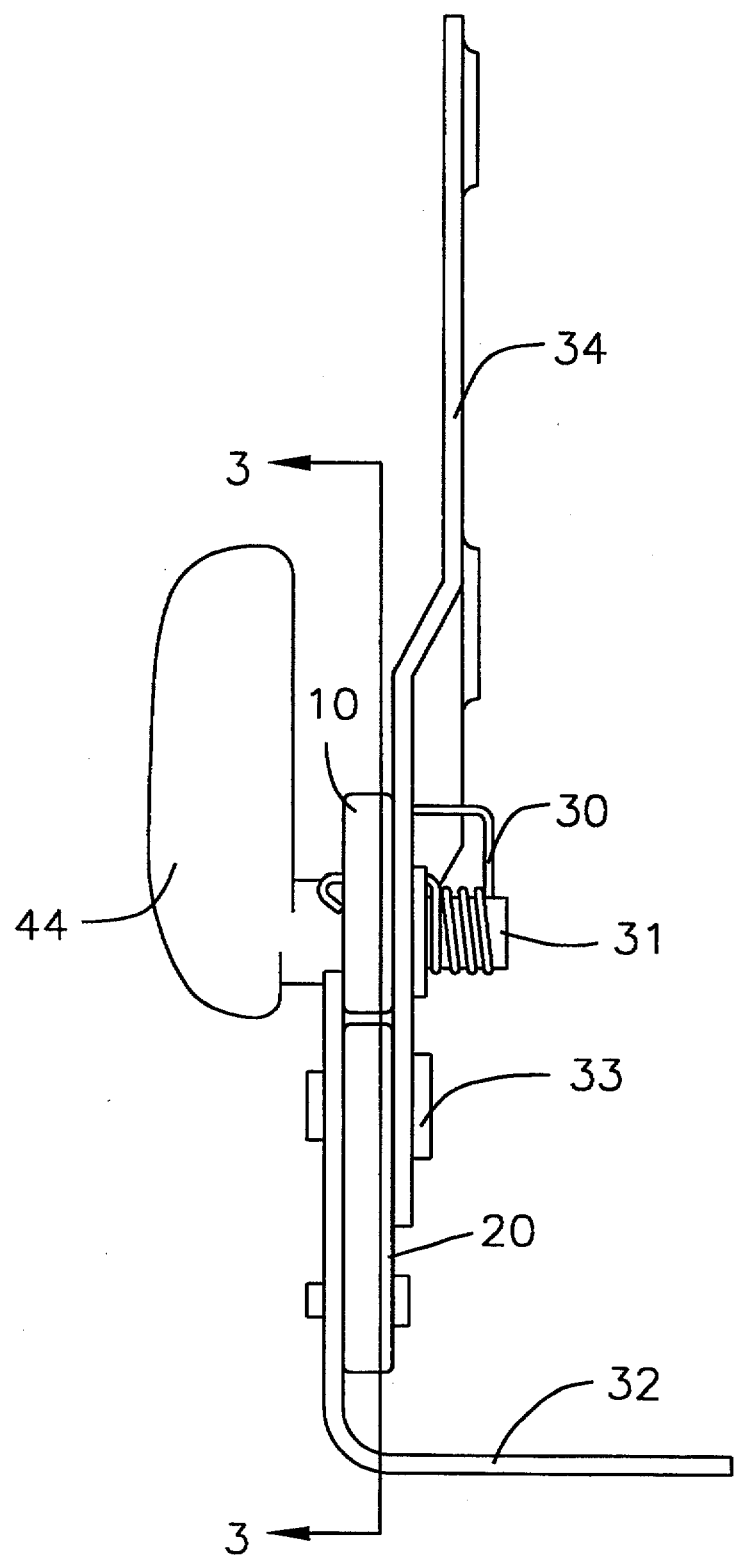
FIG. 2 is a schematic front elevational view of the latch mechanism.

Referring now to the drawings, FIG. 1 is a side elevation view of a latching mechanism in accordance with a preferred embodiment for a motor vehicle seat, having a fixed member 32 which would be rigidly attached to a seat base, and a pivotable member 34 which would be rigidly attached to a seat back. Cam 10 is pivotable about rivet 31 from a first latching position where it engages a latch plate 20 restricting motion of the pivotable member 34, to a non-latching position where the cam does not engage the latch plate. In FIG. 1 the cam 10 is shown engaging the latch plate 20 in the first latching position. Bias means such as torsion spring 30 is connected between the cam and the pivotable member at slot 66 and biases the cam towards the first latching position. Other biasing means, such as tension or compression springs will be apparent to those skilled in the art given the benefit of this disclosure. Pivotable member 34 is pivotable about rivet 33. Release handle 44, shown in FIG. 2, may be used by an operator to manually overcome the force of the spring to lift the cam out of engagement with the latch plate 20 and allow free pivoting of the pivotable member.

Figure 3:
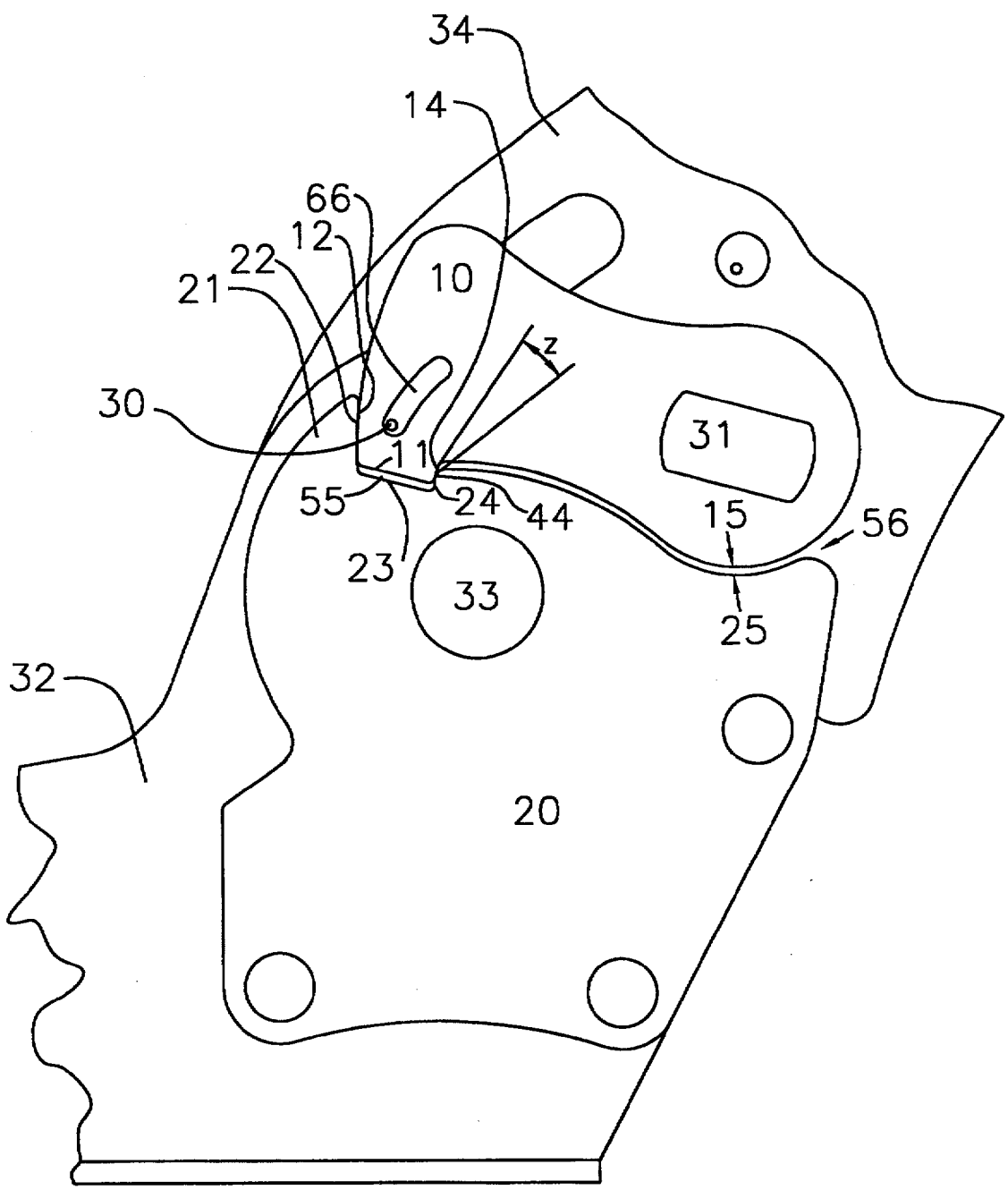
FIG. 3 is an enlarged fragmentary cross-section taken along line 3—3 of FIG. 2.

FIG. 3 focuses on the improved cam and latch plate. Preferably both the cam and latch plate are fineblanked parts. The latch plate is seen to have a tooth 21 at a forward side, a front ramp 22 extending from the tooth leading to notch 23. A back ramp or chamfer 24 extends up and away from the notch. At the rear end of the top surface of the latch plate is rear stop or shoe 25. The cam is shown in the first latching position and has a front face 12. The front face 12 preferably has a curved surface generally equivalent to the front ramp 22 of the latch plate, that is, the curved surfaces have corresponding curvatures, most preferably the curvatures have a relative angle of 0 degrees. The cam has a nose 11 which extends down into the notch yet preferably does not contact the notch 23 in the first latching position, leaving gap or clearance 55. Advantageously, the shape of the nose allows for accommodation of wide tolerance variations in the manufacture of the cam and the latch plate. In a highly advantageous feature, a cam heel 15 does not contact the shoe or rear stop 25 when the cam is in the normal latching position. Instead, preferably a small clearance 56 is maintained. A contact face 14 contacts the rear ramp 24 along contact line 44 in the first latching position. This is known as single point or single line contact in that the principal location where the load is transmitted from the cam to the latch plate occurs here. The contact face 14 may be either curved or linear, as may the back ramp. Preferably, both surfaces are curved and form at the contact line 44 an angle z of about 10 to 20 degrees, most preferably 15 degrees.

Advantageously, this design is quite insensitive to tolerance variations in the cam, particularly given the range of tolerances normally associated with fineblanking of metal parts. If the cam 10 is somewhat oversized, the contact face 14 contacts the chamfer 24 somewhat further up, and there may be slightly more clearance between the heel 15 and the shoe 25. If the cam is somewhat undersized, the contact face will seat lower on the chamfer 24.

During normal operation of the latch the front face 12 slides past the front ramp 22 as the cam moves out of the first latching position, and the rear ramp 24 is the principal load bearing surface for the force of the cam. However, during a sudden deceleration of the motor vehicle the front face 12 of the cam is urged towards the front ramp 22, and the front ramp resists further movement of the cam towards a non-latching position. During sudden acceleration of the motor vehicle the cam will move slightly until the heel 15 contacts the shoe 25, transmitting the inertial forces generated by the sudden acceleration or change in velocity to the latch plate at the shoe 25, and thereby resisting further dislocation of the cam.

From the foregoing disclosure and detailed description of certain preferred embodiments, it will be apparent that various modifications, additions and other alternative embodiments are possible without departing from the true scope and spirit of the invention. For example, it will be apparent to those skilled in the art, given the benefit of this disclosure, that the position of the cam and latch plate on the pivotable and fixed members of the seat can be reversed within the scope of the invention such that the cam is rotatably attached to the fixed member and the latch plate is attached to the pivotable member. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A latch mechanism comprising, in combination:
   a latch plate having a notch flanked by a front ramp and a rear ramp, and a rear stop;
   a cam releasably engageable with the latch plate, being pivotable from a first latching position to a non-latching position and comprising a nose, a front face, a contact face and a heel, wherein the front face and the front ramp have curved surfaces having corresponding curvatures; and
   bias means for urging the cam towards the latch plate;
   wherein in the first latching position the contact face of the cam is biased against the rear ramp of the latch plate and the heel has a clearance from the rear stop, and in response to a sudden change of velocity in a first direction the heel of the cam contacts the rear stop to resist movement of the cam to the non-latching position.

2. The latch mechanism of claim 1 wherein in a sudden change of velocity in a direction different from the first direction the front face of the cam urges against the front ramp of the latch plate, and the front ramp resists movement of the cam to the non-latching position.

3. The latch mechanism of claim 1 wherein the contact face contacts the rear ramp and forms a contact angle with the rear ramp of about 10 to 20 degrees.

4. The latch mechanism of claim 1 further comprising a release handle wherein operation of the release handle moves the cam from the first latching position to the non-latching position.

5. The latch mechanism of claim 1 further comprising a clearance from the latch plate notch to the nose of the cam when the cam is in the first latching position.

6. The latch mechanism of claim 1 wherein the bias means comprises a torsion spring attached to the cam biasing the cam toward the first latching position.

7. The latch mechanism of claim 6 further comprising a pivotable member, wherein the cam is rotatably mounted on the pivotable member and the torsion spring is anchored at one end to the pivotable member.

8. The latch mechanism of claim 6 further comprising a base member, wherein the cam is rotatably mounted on the base member and the torsion spring is anchored at one end to the base member.

9. A latch mechanism for releasably securing a motor vehicle seat back relative a seat base, comprising, in combination:

a fixed member;

a pivotable member, pivotable relative the fixed member;

a latch plate rigidly attached to the fixed member, having a notch flanked by a front ramp and a rear ramp, and a shoe; and a cam attached to the pivotable member, rotatable from a first latching position to a non-latching position, releasably engageable with the latch plate, comprising a front face, a contact face and a heel, the front face having a curved surface with a curvature corresponding to a curved surface of the front ramp of the latch plate;

wherein the contact face of the cam is biased against the rear ramp of the latch plate in the normal latching position, to form an angle with the rear ramp of about 10 to 20 degrees, and wherein the heel does not contact the shoe when the cam is in the first latching position, and in response to a sudden change in velocity in a first direction the front face of the cam is urged against the front ramp of the latch plate, and the cam is movable by a sudden change in velocity in a second direction opposite the first direction, until the heel contacts the shoe.

10. The latch mechanism of claim 9 wherein the contact face forms an angle with the rear ramp of about 15 degrees.

11. A latch mechanism comprising, in combination:

a latch plate having a notch flanked by a front ramp and a rear ramp, and a rear stop;

a cam releasably engageable with the latch plate, being pivotable from a first latching position to a non-latching position and comprising a nose, a front face, a contact face and a heel; and bias means for urging the cam towards the latch plate;

wherein in the first latching position the contact face of the cam is biased against the rear ramp of the latch plate and the heel has a clearance from the rear stop, and in response to a sudden change of velocity in a first direction the heel of the cam contacts the rear stop to resist movement of the cam to the non-latching position, and a sudden change of velocity in a direction different from the first direction urges the front face of the cam against the front ramp of the latch plate, and the front ramp resists movement of the cam to the non-latching position.

12. A latch mechanism comprising, in combination:

a latch plate having a notch flanked by a front ramp and a rear ramp, and a rear stop;

a cam releasably engageable with the latch plate, being pivotable from a first latching position to a non-latching position and comprising a nose, a front face, a contact face and a heel;

bias means for urging the cam towards the latch plate; and a release handle wherein operation of the release handle moves the cam from the first latching position to the non-latching position;

wherein in the first latching position the contact face of the cam is biased against the rear ramp of the latch plate and the heel has a clearance from the rear stop, and in response to a sudden change of velocity in a first direction the heel of the cam contacts the rear stop to resist movement of the cam to the non-latching position.

\* \* \* \* \*